United States Patent [19]

Jordan et al.

[11] Patent Number: 5,187,243

[45] Date of Patent: Feb. 16, 1993

[54] HIGH IMPACT, FLAME RETARDANT, TRANSPARENT BLENDS OF AROMATIC POLYCARBONATE AND POLY(ARYLOXYSILOXANE)

[75] Inventors: Therese C. Jordan, Clifton Park; Jimmy L. Webb, Ballston Lake, both of N.Y.

[73] Assignee: General Electric Company, Schenectady, N.Y.

[21] Appl. No.: 646,902

[22] Filed: Jan. 28, 1991

[51] Int. Cl.$^5$ .................................................. C08L 69/00
[52] U.S. Cl. ........................................ 525/464; 525/474
[58] Field of Search .............................. 525/464, 474

[56] References Cited

U.S. PATENT DOCUMENTS

| | | | |
|---|---|---|---|
| 4,916,194 | 4/1990 | Policastro et al. | 525/433 |
| 4,954,549 | 9/1990 | Lewis | 524/264 |
| 5,041,514 | 8/1991 | Webb et al. | 528/25 |

FOREIGN PATENT DOCUMENTS

| | | |
|---|---|---|
| 1116331 | 1/1982 | Canada . |
| 386548 | 2/1990 | European Pat. Off. . |
| 398049 | 4/1990 | European Pat. Off. . |
| 2832342 | 1/1980 | Fed. Rep. of Germany . |
| 2282450 | 8/1975 | France . |
| 940419 | 10/1963 | United Kingdom . |

*Primary Examiner*—Ralph H. Dean, Jr.
*Attorney, Agent, or Firm*—William A. Teoli; William H. Pittman

[57] ABSTRACT

Broad range blends of aromatic polycarbonate and poly(aryloxysiloxane), such as poly(silyloxytetraalkyl-biphenyleneoxide), have been found to be transparent. These blends also have been found to be flame retardant and possess excellent mechanical properties, such as high Notched Izod Impact.

3 Claims, No Drawings

HIGH IMPACT, FLAME RETARDANT, TRANSPARENT BLENDS OF AROMATIC POLYCARBONATE AND POLY(ARYLOXYSILOXANE)

REFERENCE TO COPENDING APPLICATIONS

Reference is made to copending application Ser. No. 07/497,155, filed Mar. 21, 1990 now U.S. Pat. No. 5,041,514 for Polymeric Reaction Products of Biphenols and Organosilicon Materials and Method for Making, which is a continuation in part of copending application Ser. No. 07/353,713, filed May 19, 1989, now abandoned.

BACKGROUND OF THE INVENTION

The present invention relates to flame retardant, transparent blends of aromatic polycarbonate and poly(aryloxysiloxane) which blends have been found to have high impact strength.

Prior to the present invention, as shown by Lewis, U.S. Pat. No. 4,954,549, flame retardant substantially transparent aromatic polycarbonate compositions were provided by incorporating into the aromatic polycarbonate a triarylsilicon material, such as triphenylsilanol. A suitable organic solvent was used which was allowed to evaporate after the triarylsilicon material had been properly dispersed. The resulting blend was then compression molded.

In copending application Ser. No. 07/497,155, filed Mar. 21, 1990, now U.S. Pat. No. 5,041,514 and incorporated herein by reference, there are shown Polymeric Reaction Products of Biphenols and Organosilicon Materials, such as poly(aryloxysiloxane)s, and preferably poly(silyloxybiphenyleneoxide)s, hereinafter referred to as "PAS", consisting essentially of chemically combined groups of the formula,

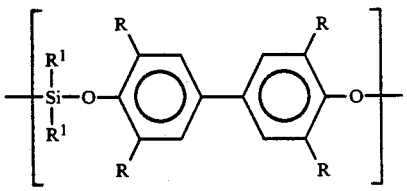

where R in formula 1 is selected from the same or different $C_{(1-8)}$ alkyl radicals, and $R^1$ is selected from the same or different $C_{(1-13)}$ monovalent hydrocarbon radicals, and $C_{(1-13)}$ monovalent hydrocarbon radicals substituted with monovalent radicals inert during condensation. PAS of formula (1) has been found to have improved hydrolytic stability. It is a high molecular weight injection moldable material exhibiting flame resistant properties.

SUMMARY OF THE INVENTION

The present invention is based on the discovery that broad range blends of PAS and aromatic polycarbonate consisting essentially of chemically combined units of the formula,

where $R^2$ is a $C_{(6-30)}$ aromatic organic radical, have been found to be transparent. In addition, the aforementioned blends of PAS and aromatic polycarbonate have been found to be flame retardant and possess excellent mechanical properties, such as high Notched Izod Impact.

STATEMENT OF THE INVENTION

There is provided by the present invention, transparent, flame retardant polycarbonate blends comprising about 5 to 80% by weight of aromatic polycarbonate consisting essentially of chemically combined units of formula 2, and about 20 to 95% by weight of poly(aryloxysiloxane) consisting essentially of chemically combined groups of formula 1, where the weight of PAS and aromatic polycarbonate is based on the weight of the flame retardant aromatic polycarbonate blend.

Radicals included by R of formula 1, are for example, alkyl radicals, such as methyl, ethyl, propyl, butyl, pentyl, and hexyl; radicals included by $R^1$ are, for example, R radicals as previously defined, and substituted R radicals, such as trifluoropropyl, cyanoalkyl, such as cyanoethyl and cyanopropyl; alkenyl radicals such as vinyl and propenyl; cycloaliphatic radicals, such as cyclopentyl, and cyclohexyl. $R^1$ also can be aryl radicals, such as phenyl, xylyl, tolyl, naphthyl and anthryl; and halogenated aryl radicals, such as chlorophenyl and bromotolyl, as well as nitroaryl radicals, such as nitrophenyl and nitrotolyl.

Polycarbonates consisting essentially of condensed units of formula 2 can be made by the phosgenation of dihydric phenols, such as
2,2-bis(2-hydroxyphenyl)propane
2,4'-dihydroxydiphenylmethane
bis(2-hydroxyphenyl)methane
2,2-bis(4-hydroxyphenyl)propane, hereinafter identified as "disphenol-A" or "BPA"
1,1-bis(4-hydroxyphenyl)ethane
1,1-bis(4-hydroxyphenyl)propane
2,2-bis(4-hydroxyphenyl)pentane
3,3-bis(4-hydroxyphenyl)pentane
4,4'-dihydroxybiphenyl
4,4'-dihydroxy-3,3',5,5'-tetramethylbiphenyl
2,4-dihydroxybenzophenone
4,4'-dihydroxydiphenyl sulfone
2,4'-dihydroxydiphenyl sulfone
4,4'-dihydroxydiphenyl sulfoxide
4,4'-dihydroxydiphenyl sulfide, etc.

Further procedures which can be used to make such aromatic polycarbonates are shown by Silva, U.S. Pat. No. 4,743,676, where aromatic polycarbonates are prepared by reacting a bischloroformate composition with a mono hydroxy aromatic compound in a mixture comprising water, base and a suitable organic liquid and then converting the resulting partially capped bischloroformate composition to linear polycarbonate by contact with an interfacial polycarbonate formation catalyst in an alkaline medium.

Additional polycarbonates and methods for making which are incorporated herein by reference, can be found in Schnell, et al., U.S. Pat. No. 3,028,365; Idel, et al., U.S. Pat. No. 4,185,009; Evans, et al., U.S. Pat. No. 4,605,731; Evans, et al., U.S. Pat. No. 4,701,519; and Brunelle, et al., U.S. Pat. No. 4,727,134. In addition Kirk-Othmer, 3rd Edition, Vol. 18, pages 479-494, shows additional procedures.

The high impact transparent blends of the present invention can be made by initially dry-blending pellets of PAS and polycarbonate and thereafter extruding the mixture. During extrusion, zone temperatures of 270° C. to 400° C. can be used. Screws speed rates of 100 rpm to 500 rpm provide effective results.

The high impact transparent blends can be used as high performance injection moldable flame retardant thermoplastics in glazing applications, housings for computers, security windows, etc.

In order that those skilled in the art will be better able to practice the present invention the following example is given by way of illustration and not by way of limitation. All parts are by weight.

EXAMPLE

A mixture of 48.4 g of tetramethylbiphenol, 14.64 g of octamethylcyclotetrasilazane and 50 ml of orthodichlorobenzene was refluxed under nitrogen. The emission of ammonia was monitored. After five hours of reflux at 295° C., there was obtained a poly (dimethylsilyloxytetramethylbiphenyleneoxide) having a M(n) of 28,244, a M(W) of 87,286 and a dispersivity of 3.09. The MW of the polymer was confirmed by GPC.

Blends of the above poly(aryloxysiloxane) (PAS) and pellets of a commercially available bisphenol A polycarbonate having a molecular weight of about 50,000, were made by dry blending the ingredients and thereafter extruding the mixture in a 20 mm co-rotating twin-screw extruder using the following conditions: zone temperatures 250°, 350°, 450° F.; die temperature 450° F. (melt temperature 290° C.); screw speed 400 rpm; feed rate 130. The resulting strands were collected, pelletized and injection-molded in 1/8" izod and tensile bars on a 28 ton molding machine. Injection molding was carried out using the following set point temperature for the zones: 465°, 485°, 485° F. and a nozzle temperature 495° F. Control bars of pure PAS and the pure polycarbonate were also molded. Flammability characteristics of the PAS and polycarbonate blends are shown as follows:

In addition to flammability characteristics, the mechanical properties of the blends were also evaluated as shown by the following table:

TABLE 2

Blends of Polycarbonate and PAS

| % PAS | Notched Izod Impact (ft-lb/in) | Modulus (kpsi) | Yield stress (psi) | Yield strain (%) | Ultimate elongation (%) |
| --- | --- | --- | --- | --- | --- |
| 0 | 17.7 | 169.4 | 9061 | 11.4 | 92 |
| 20 | 14.9 | 175.3 | 8884 | 10.7 | 84 |
| 40 | 13.7 | 183.8 | 8462 | 10.1 | 84 |
| 50 | 12.7 | 171.8 | 8178 | 10.0 | 77 |
| 60 | 12.4 | 175.4 | 7966 | 9.7 | 84 |
| 80 | 12.2 | 179.6 | 7632 | 9.3 | 69 |
| 100 | 12.9 | 184.4 | 7280 | 8.9 | 76 |

An improvement in blend impact strength was achieved by using a higher molecular weight bisphenol A polycarbonate (e.g. $M_w = 180,000$). In one study, the polycarbonate was compounded with PAS in a 75/25 PAS/polycarbonate weight ratio. Preparation of the transparent parts was achieved as before by dryblending, extruding, and inject molding. The Notched Izod Impact of 15.8 ft-lb/in of the resulting transparent material was a considerable improvement over pure PAS.

The blends of polycarbonate and PAS exhibited a lighter color than pure PAS which is a transparent yellowbrown. All of the above blends were transparent indicating homogeneity over the entire range of possible compositions.

Although the above example is directed to only a few of the very many variables which can be used in making the high impact transparent blends of the present invention, it should be understood that the present invention is directed to a much broader variety of high impact transparent blends of aromatic polycarbonate and poly(aryloxysiloxane) as shown in the description preceding this example.

What is claimed is:

1. Transparent flame retardant polycarbonate compositions comprising about 5 to 80% by weight of aromatic polycarbonate consisting essentially of condensed units of the formula,

and about 20 to about 95% by weight of poly(aryloxysiloxane) consisting essentially of chemically combined groups of the formula,

TABLE 1

Blends of Polycarbonate and PAS

| WT % PAS | FIRST FLAME OUT TIME (sec) | SECOND FLAME OUT TIME (sec) | TOTAL FLAME OUT TIME (sec) | RATING |
| --- | --- | --- | --- | --- |
| 0 | — | — | | Fail-flaming drip |
| 20 | 1.24 | 6.40 | 38.2 | V-O* |
| 40 | 1.06 | 4.10 | 25.8 | V-O |
| 50 | 1.26 | 3.30 | 22.8 | V-O |
| 60 | 1.06 | 2.60 | 18.3 | V-O |
| 80 | 0.98 | 1.98 | 14.8 | V-O |

*Marginal V-O was found at this composition with one out of 5 bars failing due to flaming drip.

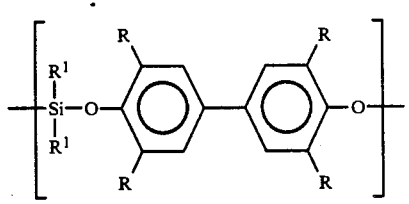

where R is selected from the same or different $C_{(1-8)}$ alkyl radicals, $R^1$ is selected from the same or different $C_{(1-13)}$ monovalent hydrocarbon radicals, and $R^2$ is a divalent $C_{(6-30)}$ aromatic organic radical.

2. A transparent polycarbonate blend in accordance with claim 1, where the aromatic polycarbonate consists essentially of chemically combined disphenol A carbonate units.

3. A transparent polycarbonate blend in accordance with claim 1, where the poly(aryloxysiloxane) is a poly(dimethylsilyltetramethylbiphenyleneoxide).

* * * * *